United States Patent [19]

Kline

[11] 4,423,079

[45] Dec. 27, 1983

[54] **GROWTH PROMOTING COMPOSITIONS FOR *LACTOBACILLUS SANFRANCISCO* AND METHOD OF PREPARATION**

[76] Inventor: Leo Kline, 1828 Mendocino St., Richmond, Calif. 94804

[21] Appl. No.: 408,308

[22] Filed: Aug. 16, 1982

Related U.S. Application Data

[63] Continuation of Ser. No. 167,858, Jul. 14, 1980, abandoned.

[51] Int. Cl.³ ............................................. A21D 2/34
[52] U.S. Cl. ........................................ 426/20; 426/62
[58] Field of Search ................................... 426/18–20, 426/61, 62, 496, 622; 435/944, 853

[56] References Cited

U.S. PATENT DOCUMENTS

| | | | |
|---|---|---|---|
| 3,891,773 | 6/1975 | Kline | 426/19 |
| 3,963,835 | 6/1976 | Gryczka | 426/18 |
| 4,021,581 | 5/1977 | Sing | 426/20 |
| 4,140,800 | 2/1979 | Kline | 426/18 |

OTHER PUBLICATIONS

Identification of a Growth Stimulant for *Lactobacillus sanFrancisco*, Berg et al., Applied and Environmental Microbiology, Nov. 1981, pp. 786–788, vol. 42, No. 5.

Spray Drying, K. Masters, CRC Press, International Scientific Series 1972, Chemical Rubber Co., p. 316.

*Primary Examiner*—Hiram H. Bernstein
*Attorney, Agent, or Firm*—Townsend and Townsend

[57] ABSTRACT

A spray-dried flour culture product is prepared by seeding a flour-water-salt suspension with natural mother or starter sponge containing strains of *Lactobacillus sanfrancisco* and *Torulopsis holmii*, incubating and holding said culture under prescribed conditions and spray-drying to yield a free flowing powder. Although the two microorganisms are virtually destroyed during spray drying, the present product contains a unique growth-promoting substance advantageous for use with prior art viable freeze-dried flour cultures as well as a useful amount of residual acidity.

19 Claims, No Drawings

GROWTH PROMOTING COMPOSITIONS FOR *LACTOBACILLUS SANFRANCISCO* AND METHOD OF PREPARATION

This is a continuation of application Ser. No. 167,858, filed July 14, 1980, now abandoned.

BACKGROUND OF THE INVENTION

1. Field of the Invention

This invention relates to a spray-dried flour culture product and a method for its preparation. The product has unique growth promoting properties for viable cells of *Lactobacillus sanfrancisco* (*L. sanfrancisco*) such as those contained in prior art freeze-dried flour cultures and also contributes a safe and economical method of adjusting the pH in the first step of bakery application to one conductive to the rapid multiplication of the *L. sanfransisco* cells.

2. Brief Description of the Prior Art

The present inventor has described in the prior art (U.S. Pat. No. 4,140,800) a freeze-dried natural sour dough starter prepared by inoculating a flour-water-salt suspension with a natural mother or starter sponge containing strains of *L. sanfrancisco* and, after optimal growth is achieved, adding an appropriate stabilizer and freeze-drying. This prior art product also contains appreciable amounts of both lactic and acetic acids.

Indirect evidence was also presented in that prior art invention for the presence in the freeze-dried starter of an unidentified substance enhancing the growth of the bacteria when both were introduced into a new flour-water system. This evidence consisted principally of the finding that the higher the level of freeze-dried starter used in a new flour-water system, the more rapid was the multiplication of the bacteria, all other factors being equal. The nature and characteristics of this postulated growth-promoting substance were not elucidated nor are they presently known. In the present invention direct evidence is provided for the presence of this substance and its ability to survive the more drastic spray drying used in the present process. This was not anticipated in view of the absence of knowledge of the properties of this substance, making it impossible to predict its survival when exposed to both heat and air which are foreign to the prior art freeze-drying process.

The prior art (Gryczka, U.S. Pat. No. 3,963,835) describes a product prepared by fermentation of a flour-water system. However, in contrast to the present process, this product is prepared by fermentation with a pure culture of a selected bacteria which are first grown out on an artificial or synthetic medium (non-flour) and the cells separated and used as the seed or inoculum. In the present specification, the product of this prior art invention, marketed under the trade name "SAN FRAN" is shown not to contain significant quantities of the growth-promoting substance which is part of the composition of this present invention. Thus two basic differences may account for the uniqueness of the present product: (1) the mother sponge used as seed in the present process contains *Torulopsis holmii* (*T. holmii*) as well as *L. sanfrancisco*, and (2) these two microorganisms have been jointly cultivated in a flour culture for over 100 years. Both of these factors may contribute to the generation of the growth-promoting substance of the present invention.

SUMMARY OF THE INVENTION

In the process for preparing the present product, the objectives differ from that of the prior art freeze-dried flour culture in that maximization of the growth-enhancing substance and fermentation acids are desired along with economy of manufacture, and it is of no consequence that neither microorganism appreciably survives the process. Thus, the following differences in process and composition are noted for the present invention:

(1) After development of the viable flour culture at about 80°-82° F., and cooling to about 55°-60° F., a much longer holding period is utilized. This results in approximately 60% more residual acidity in the present spray-dried product, or a level of about 3.4% total acidity expressed as lactic acid, as compared to about 2.2% in the freeze-dried product. Thus the end point of the fermentations as monitored by pH is at about 3.5 for the present process as compared to 3.7-3.85 for the process used in manufacturing the prior art freeze-dried product. A further compositional difference noted is that the present spray-dried product retains virtually no acetic acid (0.06%) as compared to much higher proportions retained in the freeze-dried product.

(2) Stabilizers such as sweet whey or malt solids used to improve recovery of viable bacteria during preparation of the freeze-dried product are not utilized in preparing the present product as they would not only serve no useful purpose but would detract from the value of the present product as an acidulant.

(3) Spray drying, a process using enormous quantities of hot air is preferably used in the preparation of the present product and there was no way of predicting whether the growth-promoting substance would survive this economically desirable drying method. Both heat and air are absent during the bulk of the freeze-drying process. Drum drying is one alternative method for preparing the present product but is not a preferred method due to cost and handling considerations.

Accordingly, the present invention provides a method for making a composition useful for promoting growth of *Lactobacillus sanfrancisco* in bakery products comprising: (a) inoculating a water:flour culture with natural mother sponge or starter sponge containing strains of *L. sanfrancisco* and *Torulopsis holmii*, (b) developing said inoculated culture under conditions including controlled temperature which promotes growth of said microorganisms, (c) cooling said developed culture and holding it at the cooled temperature for a time sufficient to create a relatively high residual acidity, and (d) drying said culture by exposure to heat and air.

The cost of preparing the present spray-dried flour culture product is approximately 1/25 that of preparing the freeze-dried product. Obviously if the present spray-dried product can substitute in part for the freeze-dried product, the cost of application in bakery usage is much less than that if the freeze-dried product is used alone. Thus the present spray-dried product is designed to be used with the freeze-dried product to provide a source of both the growth-promoting substance and natural fermentation acids necessary to adjust the pH in bakery application to 5.6 or lower, and thereby reduce the level of freeze-dried product to about ¼ that necessary if the freeze-dried product is used alone.

DESCRIPTION OF THE PREFERRED EMBODIMENT

The process for preparing the present product is illustrated in Example 1. Although the fermentation can be carried out in one step, this would require an inordinately large amount of mother sponge along with the attendant problems of pulverizing it for use as an inoculum. Hence the preferred method as shown in Example 1 is carried out in two steps. The level of mother sponge used as seed in the first step may be determined by the fermentation time at about 82° F. desired for this step and is generally that which would provide an initial count per gram of $L.$ $sanfrancisco$ in the Step I slurry of at least about $5 \times 10^6$ and preferably between about $5 \times 10^6$ and $2 \times 10^8$. The amount or level of the Step I slurry used as seed in inoculating Step II also is a function of the time at 82° F. required for growth before cooling to about 55°–60° F. is initiated. In Example 1 an approximate 9% seed from Step I yields a 6–7 hour development time in Step II. Levels between 4% and 15% seed from Step I are preferred and provide a practical combination of yield, reasonable incubation time and a desired initial starting pH of between 5.2 and 5.7.

In Step II it is important to initiate cooling before the pH reached at about 80°–82° F. is too low, otherwise growth and acid production are virtually terminated. Thus, cooling should begin at about pH 3.8–3.9 in order to reach the desired final pH of about 3.5.

The flour:water ratio used in the slurry is that which combines an efficient medium for growth with a solids content and viscosity which lends itself to efficient spray drying. Thus, too dilute a suspension as e.g. flour:water weight ratio of 1:5 would not provide sufficient nutrients for efficient growth and would also result in excessively fine and dusty product. On the other hand flour:water weight ratios of 1:1 would be too viscous for efficient atomization and drying. Accordingly the preferred ratio of flour:water in the final slurry prepared for drying is that which yields a solids content of between about 25–40% by weight representing flour:water weight ratios of about between 1:2.5 to 1:1.5.

Salt levels of between 0.8% and 3.0% by weight of the slurry enhance the rate of growth of the microorganisms from the mother sponge, in particular the yeast moiety, *T. holmii*, and are a preferred ingredient.

Alternately, the freeze-dried flour culture of the prior art may also be used as a seed in which case Step I of Example 1 would be as follows:

4 lb. Freeze-dried culture (Kline U.S. Pat. No. 4,140,800)
70 lb. Higluten flour
175 lb. Water
1.56 lb. Salt
Initial pH=5.7, Initial count=about $3\times10^7$ Warm to 80°–82° F. and develop about 12 hours

PRESENCE OF GROWTH PROMOTING SUBSTANCE IN PRESENT PRODUCT

Activity, i.e. multiplication or acid production by *L. sanfrancisco*, was measured with the following assay medium:

50 g. Higluten flour
125 ml. Water
1.1 g. Salt

Acid production (pH decrease) has been amply shown in the prior art freeze-dried culture invention to correlate generally with multiplication or growth. Since flour imparted an initial pH of about 6.0–6.1 to this assay medium, and growth is slow at this pH, slight acidification of the initial pH to 5.7 or lower was accomplished either by acid addition or by the fermented flours being tested for growth-promoting activity.

In Example 2 the effect of the present spray dried product and another fermented flour product (SAN FRAN) compared at the same added level (6 g.), and acidification with lactic:acetic acids (7:3 w/w), on the growth of *L. sanfrancisco* cells provided by a commercial freeze-dried pure culture, were compared. First, it is noted that the present spray dried product used alone, i.e. without the viable culture, had no activity (pH decrease) over the test period. This confirms that it does not itself contain viable numbers of *L. sanfrancisco* which are virtually destroyed during spray drying. Secondly, the present spray dried product is shown to have much greater activity (pH decrease) than either the other fermented flour or direct acidification with the acid mixture. Of equal importance was the finding that the other fermented flour had no significant advantage over the lactic:acetic acid mixture.

In Example 2 the initial pH was not identical in all cases and was actually advantageous to the SAN FRAN test sample whose initial pH of about 5.3 is closer to the optimal pH for growth of *L. sanfrancisco* of about 5.0. In Example 3 the same comparisons were made but at approximately the same initial pH and actual multiplication, i.e. increase in viable count, was also measured. In terms of multiplication, the present spray dried product, which again by itself had no activity, promoted the growth of *L. sanfrancisco* about 24-fold in six hours as compared to 10 to 14-fold for the other two samples, or roughly twice as much growth, generally verifying the acid production measurements of both Examples 2 and 3. Again the other commercial fermented flour, particularly in terms of pH decrease, did not appear to have a significant advantage over simple acidification with the acid mixture.

Example 4 illustrates the main purpose or objective of the product of this invention, namely to promote more rapid growth of *L. sanfrancisco* provided by the prior art freeze-dried flour culture. In this comparison the superiority of the present spray-dried product was even more striking than the previous examples, effecting a 21-fold multiplication in six hours as compared to about 6-fold for the other two samples. Again, the other fermented flour showed no advantage over the use of simple acidification for adjusting the initial pH of the test system.

USE OF PRESENT PRODUCT IN BAKERY APPLICATION

In applying the present product and the prior art freeze-dried culture for the production of sour dough breads and rolls, the first step is the preparation of the mother or starter sponge. This is illustrated in Example 5. It should be noted that the freeze-dried product can be used alone both as a seed for the mother sponge and to accomplish the necessary acidification to about pH 5.6 but this would require about 4–5 times the levels shown in Example 5. Despite this higher level, the time required for completion of Step I in Example 5 would only be reduced by about one hour emphasizing the unique value of the present spray-dried product in greatly improving the economy of the bakery application. This uniqueness stems from combining a safe, convenient and economical way of achieving initial pH adjustment of the flour system together with a growth-promoting substance permitting use of lower levels of the prior art freeze-dried flour culture or any other source of *L. sanfrancisco*.

Example 5 illustrates a two-step preparation for either a regular dough-type mother sponge which would be prepared in the conventional horizontal or vertical type dough mixers available in virtually every bakery, or a liquid sponge requiring a tank and stirring arrangement capable of preparing the flour slurry. The liquid sponge is basically superior in requiring less development time and in developing greater numbers of viable *L. sanfrancisco* per unit weight of flour. Also it can be readily cooled to 55°–70° F. at a propitious time and used over a period of 12–18 hours as compared to the regular dough-type sponge which must be used within an hour or two of its full development.

It should be noted that either the regular or liquid type sponges can be prepared in one step by scaling up the Step I formula shown in Example 5. However, this would increase the cost about eight-fold and would appear to be justified only on the basis of making the process either simpler or more fool-proof.

It may be noted that the present spray dried product is used at a level of about 2–6%, preferably about 4%, of the flour in the first step of the mother sponge preparation or about 0.5% of the total flour through the second step of the sponge preparation. Extrapolating this to the bread dough would decrease it further to generally less than 0.1% of the flour eventually used in sour bread or roll preparation. This contrasts completely with the use and purpose of the prior art fermented flour preparation (U.S. Pat. No. 3,963,835) whose recommended use levels are from 10–90% of the total flour in the bread dough. The vital difference in levels is, of course, that the present product is an ingredient used for promoting the growth of *L. sanfrancisco*, whereas the prior art fermented flour preparation is used solely as an acidulant for preparing "synthetic" sour dough bread and rolls.

EXAMPLE 1

METHOD OF PREPARATION OF NATURAL SPRAY DRIED FLOUR CULTURE ON COMMERCIAL SCALE

Step I-Prepare slurry of following proportions using natural mother sponge as seed:

| | |
|---|---|
| 7 lb. | Mother sponge |
| 70 lb. | Higluten flour |
| 175 lb. | Water |
| 1.56 lb. | Salt |
| 254 lb. | |

Procedure: Warm to 80°–82° F. and develop with mild agitation for about 11 hours or until pH drops to about 3.8–3.85. Cool slowly to 55°14 60° F. if not used within two hours for preparation of Step II.
Pertinent:
Flour:water = 1:2.5 (about 30% solids)
Initial count = about $4 \times 10^7$ *L. sanfran.*/g.
Final count = at least $1 \times 10^9$ per g.
Initial pH = 5.6–5.7; Final pH = 3.8–3.85

Step II-Prepare slurry as follows using Step I as seed:

| | |
|---|---|
| 254 lb. | Step I slurry |
| 700 lb. | Higluten flour |
| 1750 lb. | Water |
| 15.4 lb. | Salt |
| 2719 lb. | |

Procedure: Warm to 80°–82° F. and develop with mild agitation for about 6-½ hours or until pH drops to about 3.85. Cool slowly to 55°–60° F. over a period of 2–4 hours and hold at this temperature range for an additional 12–18 hours or until pH reaches 3.5.
Pertinent:
Flour:water = 1:2.5
Initial count = about $1.3 \times 10^8$
Final Count = about $1.5 \times 10^9$
Initial pH = 5.4–5.5; Final pH = about 3.5

Step III-Spray Drying:
Slurry may be allowed to warm up either before or during spray drying. Dried in Single Head Rogers Spray Dryer, atomizing at about 2000 psi and using hot air inlet temperatures of about 360° F. and outlet air temperatures of about 185°–190° F. Degree of atomizing and air temperatures are selected to give a free-flowing, non-dusty powder containing between about 5% and 12% moisture. pH of product = 3.5–3.7.

EXAMPLE 2

| | PRELIMINARY TEST SHOWING STIMULATORY EFFECT OF PRESENT SPRAY DRIED PRODUCT ON ACTIVITY OF COMMERCIAL FREEZE-DRIED CULTURE OF *Lactobacillus sanfrancisco*[1] | | | | | | |
|---|---|---|---|---|---|---|---|
| | Added to Base Activity Test Mixture[2] | | | | | | |
| | 6 g. Present SD[3] Product Used Alone | | 0.35 g. Comm. FD[4] Culture plus 3.5 ml. 2% Lactic:Acetic Acids (7:3, w/w) | | 0.35 g. Comm. FD Culture plus 6 g. SAN FRAN[5] | | 0.35 g. Comm. FD Culture plus 6 g. Present SD Product | |
| Time (hr.) | pH | pH decrease | pH | pH decrease | pH | pH decrease | pH | pH decrease |
| 0 | 5.68 | — | 5.57 | — | 5.32 | — | 5.57 | — |
| 5¼ | 5.68 | 0 | 5.53 | .03 | 5.28 | .04 | 5.42 | .15 |
| 7½ | 5.68 | 0 | 5.10 | .47 | 4.81 | .51 | 4.75 | .82 |

[1]Pure culture of *L. sanfrancisco* grown on synthetic medium (non flour) and freeze-dried. Contained about $3 \times 10^9$ viable cells per g.
[2]Base mixture for activity test: 50 g. Higluten flour, 125 ml. total water, 1.1 g. salt. Initial pH that obtained by indicated amounts of added compounds.
[3]SD = spray dried
[4]FD = freeze dried
[5]SAN FRAN = Commercial fermented spray dried flour product prepared by pure culture fermentation (U.S. Pat. No. 3,963,835).

EXAMPLE 3

STIMULATORY EFFECT OF PRESENT SPRAY DRIED PRODUCT ON GROWTH OF A COMMERCIAL FREEZE-DRIED CULTURE OF Lactobacillus sanfrancisco[1]

| | Added to Base Activity Test Mixture[2] | | | |
|---|---|---|---|---|
| Time (hr.) | 7 g. Present SD Product Used Alone pH decrease | 0.35 g. Comm. FD Culture plus 3.6 ml. 2% Lactis:Acetic Acids (7:3, w/w) pH decrease | 0.35 g. Comm. FD Culture plus 5 g. SAN FRAN[3] pH decrease | 0.35 g. Comm. FD Culture plus 7 g. Present SD Product pH decrease |
| 5½ | 0 | 0.16 | 0.13 | 0.25 |
| 7 | 0 | 0.42 | 0.38 | 0.59 |
| 8 | 0 | 0.68 | 0.68 | 0.96 |
| | Viable Count / Multipl. | Viable Count / Multipl. | Viable Count / Multipl. | Viable Count / Multipl. |
| 0 | — / — | $1.14 \times 10^7$ / — | $1.14 \times 10^7$ / — | $1.14 \times 10^7$ / — |
| 6 | — / — | $1.15 \times 10^8$ / 10.1× | $1.67 \times 10^8$ / 14.6× | $2.76 \times 10^8$ / 24.2× |

[1] cf. footnote 1 Ex. 2
[2] Base activity test mixture as in footnote 2 Ex. 2. However, in this case added compounds were adjusted to give approximately same initial pH in all cases = 5.23 ± .05.
[3] cf. footnote 5 Ex. 2.

EXAMPLE 4

STIMULATORY EFFECT OF PRESENT SPRAY DRIED PRODUCT ON GROWTH OF Lactobacillus sanfrancisco FROM PRIOR ART FREEZE-DRIED NATURAL FLOUR CULTURE[1]

| | Added to Base Activity Test Mixture[2] | | |
|---|---|---|---|
| Time (hr.) | 1 g. FD Flour Culture plus 3.6 ml. 2% Lactic:Acetic Acids (7:3, w/w) pH decrease | 1 g. FD Flour Culture plus 4 g. SAN FRAN[3] pH decrease | 1 g. FD Flour Culture plus 6 g. Present SD Product pH decrease |
| 5½ | 0.11 | 0.07 | 0.17 |
| 7 | 0.40 | 0.27 | 0.57 |
| | Viable Count / Multipl. | Viable Count / Multipl. | Viable Count / Multipl. |
| 0 | $6.3 \times 10^5$ / — | $6.3 \times 10^5$ / — | $6.3 \times 10^5$ / — |
| 6 | $4.0 \times 10^6$ / 6.3× | $4.0 \times 10^6$ / 6.3× | $13.3 \times 10^6$ / 21.2× |

[1] Kline, U.S. Pat. No. 4,140,800
[2] Base activity test mixture as in footnote 2 Ex. 2. In this case added compounds were adjusted to give approximately same initial pH in all cases = 5.21 ± .03.
[3] cf. footnote 5 Ex. 2.

EXAMPLE 5

USE OF PRESENT SPRAY DRIED PRODUCT IN PREPARING STARTER OR MOTHER SPONGE

A. Regular (dough type)

Step I:
| | |
|---|---|
| 0.2 lb. | Prior Art Freeze Dried Culture[1] |
| 0.8 lb. | Present Spray Dried Product |
| 20.0 lb. | Higluten flour |
| 8.5 lb. | Water |
| 29.5 lb. | |

Develop 12-13 hours at 80-82° F.
Initial pH = 5.5-5.6, Final pH = 3.9-3.95
Initial count = about $7 \times 10^6$
Final count = about $1 \times 10^9$ Step II:
| | |
|---|---|
| 29.5 lb. | Step I |
| 140.0 lb. | Higluten flour |
| 61.0 lb. | Water |
| 230.5 lb. | Sponge[2] |

Develop about 6 hours at 80-82° F.
Initial pH = about 5.4, Final pH = 3.9 ± .05
Initial count = about $1.3 \times 10^8$
Final count = about $1.5 \times 10^9$

B. Liquid Type Sponge

Step I:
| | |
|---|---|
| 0.2 lb. | Prior Art Freeze Dried Culture[1] |
| 0.8 lb. | Present Spray Dried Product |
| 20.0 lb. | Higluten flour |
| 20.0 lb. | Water |
| 0.15 lb. | Salt |
| 41.15 lb. | |

Develop about 11 hours at 80-82° F.
Initial pH = 5.5-5.6, Final pH = 3.8-3.85
Initial count = about $5 \times 10^6$
Final count = about $1.5 \times 10^9$ Step II:
| | |
|---|---|
| 41.15 lb. | Step I |
| 140.0 lb. | Higluten flour |
| 140.0 lb. | Water |
| 1.19 lb. | Salt |
| 322.34 lb. | Sponge[2] |

Develop 5 to 5½ hours at 82° F.
Initial pH = 5.3 ± 0.1, Final pH = 3.8-3.85
Initial count = about $1.8 \times 10^8$
Final count = about $2.0 \times 10^9$

[1] Kline, U.S. Pat. No. 4,140,800
[2] Makes about 810 to 2500 lb. of bread dough depending upon the proof time desired for the bread dough after molding which determines the proportion of sponge used. Water in bread dough formula adjusted for difference in water content of the two types of sponges.

I claim:
1. A method for making a composition useful for promoting growth of Lactobacillus sanfrancisco in bakery products comprising:

a. inoculating a water:flour culture with natural mother sponge or starter sponge containing strains of *L. sanfrancisco* and *Torulopsis holmii,*
b. developing said inoculated culture under conditions including controlled temperature whch promotes growth of said microorganisms,
c. cooling said developed culture and holding it at the cooled temperature for a time sufficient to create a relatively high residual acidity, and
d. drying said culture by exposure to heat and air, substantially all viable *L. sanfrancisco* being destroyed during said drying.

2. A method in accordance with claim 1 wherein said drying is executed by spray drying the culture with hot air.

3. A method in accordance with claim 2 wherein the hot air temperatures are selected to provide a free flowing dry powder of about 5–12% by weight of moisture.

4. A method in accordance with claim 2 wherein the culture is inoculated with natural mother sponge to provide an initial count of at least about $5 \times 10^6$ viable cells per gram of said culture.

5. A method in accordance with claim 2 wherein the culture is inoculated with natural mother sponge to provide an initial count of about $5 \times 10^6$ to $2 \times 10^8$ viable cells per gram of said culture.

6. A method in accordance with claim 2 wherein the flour to water ratio of said culture is selected to provide growth of said microorganisms and a viscosity suitable for spray drying.

7. In method in accordance with claim 6 wherein the culture has a solids content of about 25–40% by weight.

8. A method in accordance with claim 7 wherein the flour to water weight ratio is about between 1:2.5 to 1:1.5.

9. A method in accordance with claim 2 wherein said culture contains about 0.8–3.0% by weight of sodium chloride.

10. A method in accordance with claim 2 wherein said culture is developed at a temperature of about 80°–82° F. and thereafter cooled and held at a temperature of about 55°–60° F.

11. A method in accordance with claim 2 wherein said culture is held after cooling until the pH drops to about 3.5.

12. A method in accordance with claim 2 wherein said developing and holding is executed in two stages in which microorganisms grown in a first stage water:flour culture are used to inoculate a second water:flour culture for growth of said microorganisms therein.

13. A method in accordance with claim 12 wherein development in the first water:flour culture is executed at about 82° F. until the pH drops to about 3.80–3.85.

14. A method in accordance with claim 13 wherein about 4–15 weight percent developed culture of the first stage is used to inoculate the water:flour culture of stage two.

15. A method in accordance with claim 14 wherein the second stage culture is developed at about 80°–82° F. untilthe pH drops to about 3.85 and the culture is thereafter cooled to about 55°–60° F. and held until the pH reaches about 3.5.

16. The product obtained by the method of claim 1.

17. The product obtained by the method of claim 15.

18. In the process for making sour dough bakery products by adding a *Lactobacillus sanfrancisco* starter to dough and developing said microorganism in the dough, the improvement wherein the product produced by the method of claim 1 is added to said dough in an effective amount to reduce the amount of *Lactobacillus sanfrancisco* for making the sour dough bakery product.

19. In the process for making sour dough bakery products by adding a *Lactobacillus sanfrancisco* starter to dough and developing said microorganism in the dough, the improvement wherein the product produced by the method of claim 15 is added to said dough in an effective amount to reduce the amount of *Lactobacillus sanfrancisco* for making the sour dough bakery product.

* * * * *